United States Patent Office 3,419,607
Patented Dec. 31, 1968

3,419,607
OXIDATION OF ACROLEIN OR METHACROLEIN WITH AN ANTIMONY-PHOSPHORUS-VANADIUM-OXYGEN CATALYST
Peter Hurst, Widnes, England, assignor to Imperial Chemical Industries Limited, London, England, a corporation of Great Britain
No Drawing. Filed May 11, 1964, Ser. No. 366,600
Claims priority, application Great Britain, May 21, 1963, 20,174/63
6 Claims. (Cl. 260—530)

ABSTRACT OF THE DISCLOSURE

There is provided a process for the manufacture of acrylic acid and methacrylic acid from acrolein and methacrolein by interacting the alkenals with oxygen in the vapor phase at between about 250 and 500 C. in the presence of a catalyst containing phosphorus, vanadium, antimony and oxygen. The catalyst may be supported on or mixed with conventional solids such as silica and in a static or fluidized state. The oxygen feed may be pure oxygen or air as such or diluted with an inert gas such as nitrogen or steam.

---

This invention relates to a process for the manufacture of unsaturated carboxylic acids from unsaturated aldehydes, and more particularly to a catalytic vapour-phase process whereby an alkenoic acid is made by interaction of an alkenal and oxygen. The process is especially applicable to the production of acrylic acid by interaction of acrolein and oxygen.

According to the present invention there is provided a process for the manufacture of alkenoic acids which comprises contacting a mixture of an alkenal and oxygen at elevated temperature with a catalyst containing antimony, phosphorus, vanadium and oxygen.

In the process the catalyst specified produces a useful conversion of the alkenal to the desired alkenoic acid without great loss of materials through complete oxidation of the alkenal to carbon dioxide and water. The catalyst may be made for example by mixing aqueous solutions of phosphoric acid and ammonium metavanadate with a solution of antimony trichloride in hydrochloric acid and then evaporating the mixture to dryness and calcining it.

The proportions of antimony, phosphorus and vanadium may be varied and selected by trial so as to achieve the optimum combination of physical and catalytic properties for the particular alkenal and process to be employed. We prefer to use proportions of antimony, phosphorus, and vanadium such that the total number of gram atoms of phosphorus and vanadium is greater than the number of gram atoms of antimony, particularly when the process is used for the oxidation of acrolein.

The catalyst may be in finely divided form or may be used as granules or pellets, and may if desired be supported upon or mixed with conventional inert solids, for example silica. The mass of catalyst may be static in use, or may be employed using fluidised bed techniques.

The process of the present invention is especially efficient when the alkenal is acrolein but other alkenals may be used, for example methacrolein.

Pure oxygen may be used, but air or other gas mixtures containing free oxygen may also be used.

The mixture of alkenal and oxygen may be diluted for example with nitrogen, steam or saturated hydrocarbons.

The proportion of oxygen and alkenal in the mixture to be contacted with the catalyst may be varied to suit the particular alkenal and reaction temperature to be employed. Very suitable mixtures are those containing between about 0.5 and 5 parts by volume of oxygen for each part by volume of acrolein.

The composition of the feed gas may be adjusted as desired so as to avoid inflammability or explosive properties.

Suitable temperatures at which the mixture of the alkenal and oxygen may be contacted with the catalyst are those in the range between about 250° C. and 500° C. The optimum temperature in any instance will depend upon such factors as the particular alkenal and contact time employed.

The mixture of alkenal and oxygen may be passed over the catalyst in a reactor vessel provided with appropriate heating and/or cooling means to maintain the catalyst in the reaction zone at the desired temperature, while making due allowance for heat liberated during reaction. It is usually convenient to operate the process with the mixture of alkenal and oxygen at substantially atmospheric pressure, any excess pressure above atmospheric pressure being for the purpose of promoting the flow of gas through the reactor and ancillary apparatus. Higher or lower pressures may be used if desired, however.

The rate of flow of the mixture of alkenal and oxygen is usually such as to give a contact time with the catalyst of between about 0.5 second and about 10 seconds, preferably between 1 and 5 seconds.

The alkenoic acid (for example acrylic acid) may be isolated from the gas emerging from the catalyst by conventional means, for example by condensation, scrubbing with water, fractional distillation and combination of such techniques. Unreacted alkenal remaining after extraction of the desired products may, if desired, be recycled to the gas mixture fed into the catalyst; the diluent may, if economically appropriate, be recycled also. Acrylic acid so obtained may be converted into esters. The acrylic acid, acrylic esters and corresponding compounds derived from other aldehydes may be used for the manufacture of a wide variety of polymers and copolymers of industrial value.

The invention is illustrated but not limited by the following examples. All parts are by weight unless otherwise stated.

A supported catalyst containing 1 gram atom of vanadium and 1.25 gram atoms of phosphorus for each gram atom of antimony was prepared as follows.

15 parts of ammonium metavanadate were dissolved in 750 parts of water at 80° C. and a solution containing 16 parts of phosphoric acid, $H_3PO_4$, in 55 parts of water was added with stirring. 30 parts of antimony trichloride were dissolved in the minimum quantity of concentrated hydrochloric acid and added slowly, with stirring, to the mixed aqueous solutions of ammonium metavanadate and phosphoric acid. 70 parts of silica gel were added, with stirring, in the form of a dialysed solution of "Syton P" ("Syton P" is a trade name) and the mixture was evaporated to dryness. The residue was dried at 120° C. for 24 hours and then heated in a purge of air at 540° C. for 16 hours. The catalyst was graded to 14–36 B.S.S. mesh size before use.

A gas mixture consisting of (by volume) 10% of acrolein, 10% of oxygen, 40% of nitrogen and 40% of steam was passed over a portion of the catalyst prepared as described above, the catalyst being mixed with three times its own volume of 8–14 B.S.S. mesh particles of "Pyrex" glass. The flow of the gas mixture was such that the contact time, calculated from the volume of gas at 25° C. and 760 mm. Hg and the volume of catalyst, was 3.75 seconds. The reaction temperature was 381° C. Analysis of the effluent gases showed that 62% of the acrolein fed was consumed and 78% of the acrolein consumed was converted into acrylic acid.

Example 2

A catalyst was prepared as described in Example 1 except that the silica gel support was omitted. The catalyst was dried, heated, graded and mixed with glass particles as described in Example 1 and tested under the same conditions as in Example 1 except that the reaction temperature was 408° C. 47% of the acrolein fed was consumed and 70% of the acrolein consumed was converted into acrylic acid.

Another portion of the same catalyst was tested under the same conditions except that the gas mixture consisted of (by volume) 5% of acrolein, 10% of oxygen, 45% of nitrogen and 40% of steam. 50% of the acrolein fed was consumed and 69% of the acrolein consumed was converted into acrylic acid.

Example 3

A supported catalyst containing 2 gram atoms of vanadium and 2 gram atoms of phosphorus for each gram atom of antimony was prepared as described in Example 1 except that 12.8 parts of phosphoric acid and 15 parts of antimony trichloride were used. The catalyst was dried, heated, graded and mixed with glass particles as described in Example 1 and tested under the same conditions as in Example 1 except that the reaction temperature was 396° C. 65% of the acrolein fed was consumed and 66% of the acrolein consumed was converted into acrylic acid.

By way of comparison an unsupported catalyst was prepared in the same way except that the phosphoric acid was omitted. The catalyst was dried, heated, graded and mixed with glass particles as described in Example 1 and tested under the same conditions as in Example 1 except that the reaction temperature was 346° C. 57% of the acrolein fed was consumed and only 10% of the acrolein consumed was converted into acrylic acid.

Example 4

A supported catalyst containing 0.67 gram atom of vanadium and 0.67 gram atom of phosphorus for each gram atom of antimony was prepared as described in Example 1 except that 12.8 parts of phosphoric acid and 45 parts of antimony trichloride were used. The catalyst was dried, heated, graded and mixed with glass particles as described in Example 1 and tested under the same conditions as in Example 1.

66% of the acrolein fed was consumed and 63% of the acrolein consumed was converted into acrylic acid.

Example 5

A supported catalyst containing 1 gram atom of vanadium and 0.5 gram atom of phosphorus for each gram atom of antimony was prepared as follows.

23.4 parts of ammonium metavanadate were dissolved in 1000 parts of water at 80° C. and a solution containing 9.8 parts of phosphoric acid, $H_3PO_4$, in 50 parts of water was added with stirring. 45.6 parts of antimony trichloride were dissolved in the minimum quantity of concentrated hydrochloric acid and added slowly, with stirring, to the mixed aqueous solutions of ammonium metavanadate and phosphoric acid. 120 parts of silica gel were added, with stirring, in the form of a dialysed solution of "Syton P" and the mixture was evaporated to dryness. The catalyst was dried, heated, graded and mixed with glass particles as described in Example 1 and tested under the same conditions as in Example 1 except that the reaction temperature was 390° C.

59% of the acrolein fed was consumed and 48% of the acrolein consumed was converted into acrylic acid.

What I claim is:

1. A process for the manufacture of an alkenoic acid selected from the group consisting of acrylic acid and methacrylic acid which comprises interacting an alkenal selected from the group consisting of acrolein and methacrolein and oxygen in the vapour phase at an elevated temperature between about 250 and 500° C. in the presence of a catalyst consisting essentially of antimony, phosphorus, vanadium and oxygen and wherein the total number of gram atoms of phosphorus and vanadium in the catalyst is greater than the number of gram atoms of antimony.

2. A process as claimed in claim 1 wherein the catalyst is deposited on a support.

3. A process as claimed in claim 1 wherein the alkenal is acrolein.

4. A process as claimed in claim 1 wherein the feed contains oxygen in the proportions of between 0.5 and 5 parts by volume of oxygen for each part by volume of acrolein.

5. A process as claimed in claim 1 wherein the reaction is carried out in the presence of an inert gaseous diluent.

6. A process as claimed in claim 6 wherein the inert gaseous diluent is nitrogen or steam or a mixture thereof.

References Cited

UNITED STATES PATENTS

| 2,881,212 | 4/1959 | Idol | 260—530 |
| 3,238,254 | 3/1966 | Kerr | 260—530 |

LORRAINE A. WEINBERGER, *Primary Examiner.*

V. GARNER, *Assistant Examiner.*